(12) United States Patent
Lee et al.

(10) Patent No.: US 7,180,336 B2
(45) Date of Patent: Feb. 20, 2007

(54) GLITCH-FREE CLOCK SWITCHING APPARATUS

(75) Inventors: Yong-Mi Lee, Suwon-si (KR); Hae-Jin Song, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

(21) Appl. No.: 11/109,326

(22) Filed: Apr. 19, 2005

(65) Prior Publication Data

US 2005/0270073 A1 Dec. 8, 2005

(30) Foreign Application Priority Data

Jul. 6, 2004 (KR) .................. 10-2004-0052316

(51) Int. Cl.
*G06F 1/08* (2006.01)
*H03K 17/00* (2006.01)

(52) U.S. Cl. ......................... 327/99; 327/298
(58) Field of Classification Search ............ None
See application file for complete search history.

(56) References Cited

U.S. PATENT DOCUMENTS

| | | | |
|---|---|---|---|
| 5,357,146 A * | 10/1994 | Heimann | 327/292 |
| 5,623,223 A | 4/1997 | Pasqualini | 327/298 |
| 6,559,679 B2 | 5/2003 | Kim | 326/93 |
| 6,563,349 B2 * | 5/2003 | Menezes et al. | 327/99 |
| 6,600,345 B1 | 7/2003 | Boutaud | 327/99 |
| 7,046,047 B2 * | 5/2006 | Daijo | 327/99 |

OTHER PUBLICATIONS

Korean Patent Application No. 1019960043660 to Park, having Publication date of Mar. 13, 1999 (w/English Abstract page).

* cited by examiner

*Primary Examiner*—Tuan T. Lam
(74) *Attorney, Agent, or Firm*—Monica H. Choi

(57) ABSTRACT

In a clock switching apparatus, a corresponding mask clock signal is generated for at least one of first and second clock signals. A mask clock signal has an interval of a predetermined logical level near the switching between the clock signals. Each mask clock signal is synchronized to the first and/or second clock signals. Such an interval in the mask clock signal prevents occurrence of glitches in an output clock signal that is switched between at least one mask clock signal and/or at least one clock signal.

20 Claims, 10 Drawing Sheets

GLITCH-FREE CLOCK SWITCHING APPARATUS

BACKGROUND OF THE INVENTION

This application claims priority to Korean Patent Application No. 2004-52316, filed on Jul. 6, 2004, in the Korean Intellectual Property Office, the disclosure of which is incorporated herein in its entirety by reference.

1. Field of the Invention

The present invention relates generally to clock signal generators, and more particularly, to a clock switching apparatus that switches between clock signals without generating a glitch.

2. Description of the Related Art

Digital electronic systems often use a clock signal to synchronize and control operations of various circuits (e.g., logic gates, flip-flops, latches, etc.). In many digital electronic systems including a microprocessor, there exist multiple clock sources. Mechanisms for switching between the clock sources are needed.

FIG. 1 is a block diagram of a conventional clock selection circuit using a multiplexer 100. Referring to FIG. 1, the multiplexer 100 receives two clock signals, including a fast clock signal CLOCK_FAST and a slow clock signal CLOCK_SLOW. The multiplexer 100 switches between the fast clock signal CLOCK_FAST and the slow clock signal CLOCK_SLOW in response to a selection signal SELECT to generate an output clock signal CLOCK_OUT.

For example, when the selection signal SELECT is logic high, the slow clock signal CLOCK_SLOW is output as the output clock signal CLOCK_OUT. Alternatively, when the selection signal SELECT is logic low, the fast clock signal CLOCK_FAST is output as the output clock signal CLOCK_OUT.

FIG. 2 shows a timing diagram of the signals SELECT, CLOCK_FAST, CLOCK_SLOW, and CLOCK_OUT during operation of the clock selection circuit of FIG. 1. Referring to FIG. 2, when the selection signal SELECT is logic high, the CLOCK_SLOW signal is output as the output clock signal CLOCK_OUT. In the example of FIG. 2, the logic level of the SELECT signal transitions from logic high to logic low when the CLOCK_SLOW signal is logic high and the CLOCK_FAST signal is logic low. At this time, a shortened pulse 210 (i.e., a glitch) is generated in the output clock signal CLOCK_OUT.

Subsequently, in response to the logic low level of the SELECT signal, the fast clock signal CLOCK_FAST is output as the output clock signal CLOCK_OUT. Thereafter, the logic level of the SELECT signal transitions from logic low to logic high when the fast clock signal CLOCK_FAST is logic low and the slow clock signal CLOCK_SLOW is logic high. At this time, another shortened pulse 220 (i.e., another glitch) is generated in the output clock signal CLOCK_OUT.

Generally, a glitch causes errors during execution of a microprocessor or other system components because the glitch may erratically clock flip-flops, latches, etc. Therefore, prevention of glitches is desired. U.S. Pat. Nos. 6,559,679 and 6,600,345 disclose mechanisms for preventing glitches. The circuits disclosed in U.S. Pat. Nos. 6,559,679 and 6,600,345 are illustrated in FIGS. 3 and 4, respectively.

In a glitch-free clock multiplexer circuit of FIG. 3 from U.S. Pat. No. 6,559,679, occurrence of glitches is prevented by holding an output clock signal CLOCK_OUT while transitions of an A clock signal CLOCK_A and a B clock signal CLOCK_B are being counted. However, the glitch-free clock multiplexer circuit of FIG. 3 is suitable for a case where a difference between frequencies of the A and B clock signals CLOCK_A and CLOCK_B is not significant and may be determined.

When the difference between the frequencies of the A and B clock signals CLOCK_A and CLOCK_B cannot be determined, a transition interval between clock switching cannot be determined, thereby causing a problem in producing a logic state transition. When the difference between the frequencies of the A and B clock signals CLOCK_A and CLOCK_B is significant, a delay interval between switching increases due to an influence of one of the CLOCK_A and CLOCK_B signals with the lower frequency. Such an increase in delay interval results in a long delay between when the clock selection signal SEL_CLOCK transits and when the output clock signal CLOCK_OUT is switched.

A glitch-free clock selection switch of FIG. 4 from U.S. Pat. No. 6,600,345 needs synchronization logic to produce enable signals EN1 and EN2 used upon clock switching between first and second clock signals CLOCK_1 and CLOCK_2. The glitch-free clock selection switch of FIG. 4 prevents the occurrence of glitches in an output clock signal CLOCK_OUT by latching a slow clock signal and a fast clock signal twice each.

Unfortunately, when the difference between frequencies of the first and second clock signals CLOCK_1 and CLOCK_2 is significant in FIG. 4, a delay interval between switching increases due to an influence of one of the clock signals CLOCK_1 and CLOCK_2 with the lower frequency. Such an increase in delay interval results in a long delay between when the enable signals EN1 and EN2 transit and when the output clock signal CLOCK_OUT is switched.

Thus, a mechanism is desired for switching between clock signals with minimized clock switching interval regardless of a difference between frequencies of the clocks.

SUMMARY OF THE INVENTION

Accordingly, a corresponding mask clock signal is generated for at least one of first and second clock signals. A mask clock signal has an interval of a predetermined logical level near the switching between the clock signals. Such an interval prevents occurrence of glitches in an output clock signal that is switched between the clock signals.

In a first embodiment of the present invention, a clock switching apparatus includes a synchronizer for synchronizing a selection signal with a first clock signal to generate a first selection delay signal, and for synchronizing the first selection delay signal with a second clock signal to generate a second selection delay signal. In addition, the clock switching apparatus also includes a mask clock generator for generating a mask clock signal in response to the second selection delay signal and the second clock signal. Furthermore, an output generator outputs one of the first clock signal and the mask clock signal as an output clock signal in response to the first selection delay signal.

In another embodiment of the present invention, a clock switching apparatus includes a synchronizer for synchronizing a selection signal with a first clock signal to generate a first selection delay signal, and for synchronizing the first selection delay signal with a second clock signal to generate a second selection delay signal, and for synchronizing the second selection delay signal with the first clock signal to generate a third selection delay signal, and for synchronizing the second selection delay signal with the second clock signal to generate a fourth selection delay signal. In addition, the clock switching apparatus also includes a mask clock generator for generating a mask clock signal in response to the second and fourth selection delay signals and the second clock signal. Furthermore, an output generator outputs one of the first clock signal and the mask clock signal as an output clock signal in response to the third selection delay signal.

In a further embodiment of the present invention, a clock switching apparatus includes a synchronizer that generates the first, second, third, and fourth selection delay signals. In addition, the clock switching apparatus also includes a first mask clock generator for generating a first mask clock signal in response to the second and fourth selection delay signals and the second clock signal. Furthermore, a second mask clock generator generates a second mask clock signal in response to the second selection delay signal and the second clock signal. Also, a switching clock generator outputs one of the first clock signal and the first mask clock signal as a switching clock signal in response to the third selection delay signal. Additionally, an output generator outputs one of the switching clock signal and the second mask clock signal as an output clock signal in response to the first selection delay signal.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, 4, 5, 6, 7, 8, 9, 10, and 11 refer to elements having similar structure and/or function.

DETAILED DESCRIPTION OF THE INVENTION

Figure 1:
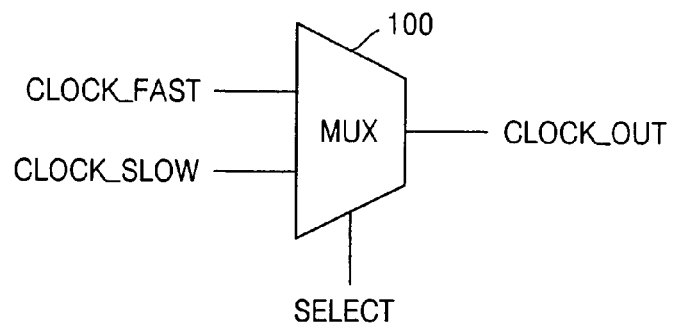
FIG. 1 is a block diagram of a conventional clock selection circuit with a multiplexer.
Figure 2:
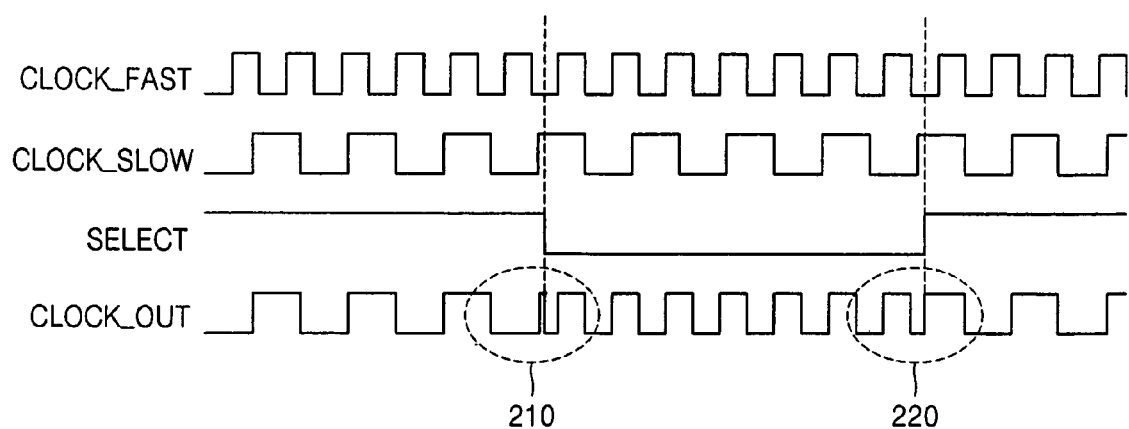
FIG. 2 illustrates a timing diagram for signals including glitches in an output clock signal during operation of the clock selection circuit of FIG. 1.
Figure 3:
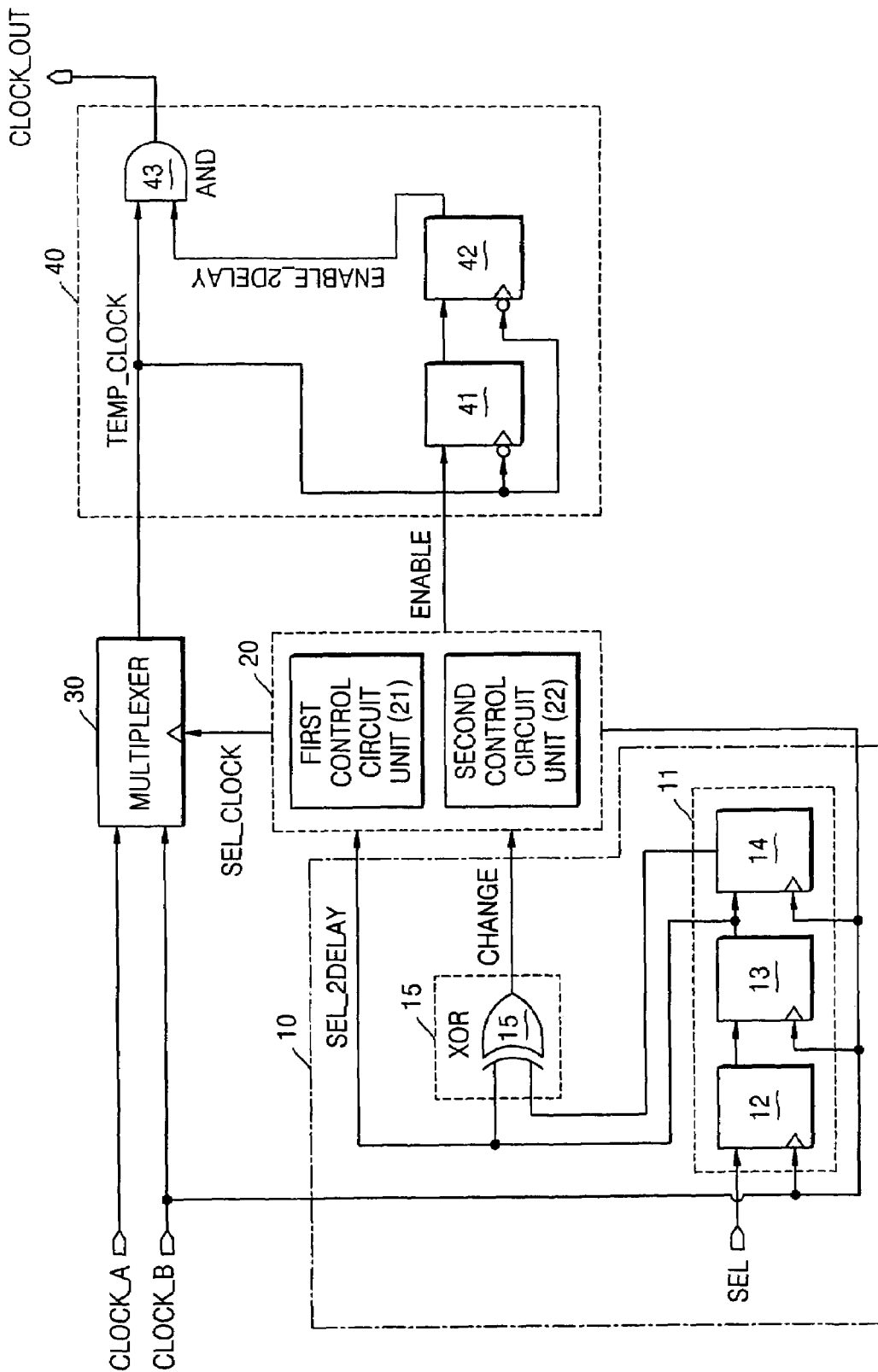
FIG. 3 is a circuit diagram of a conventional glitch-free clock multiplexer circuit.
Figure 4:
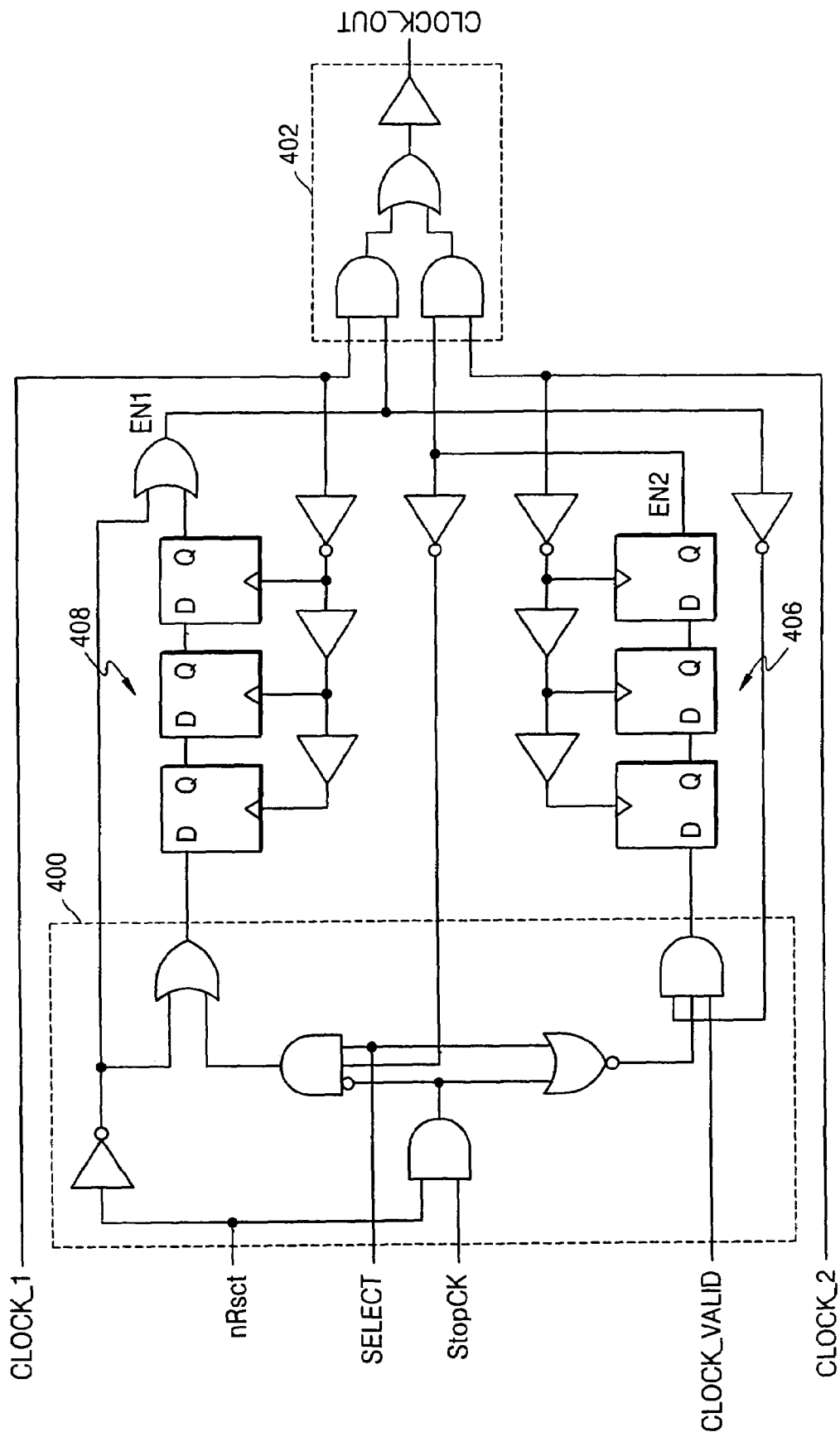
FIG. 4 is a circuit diagram of a conventional glitch-free clock selection switch.
Figure 5:
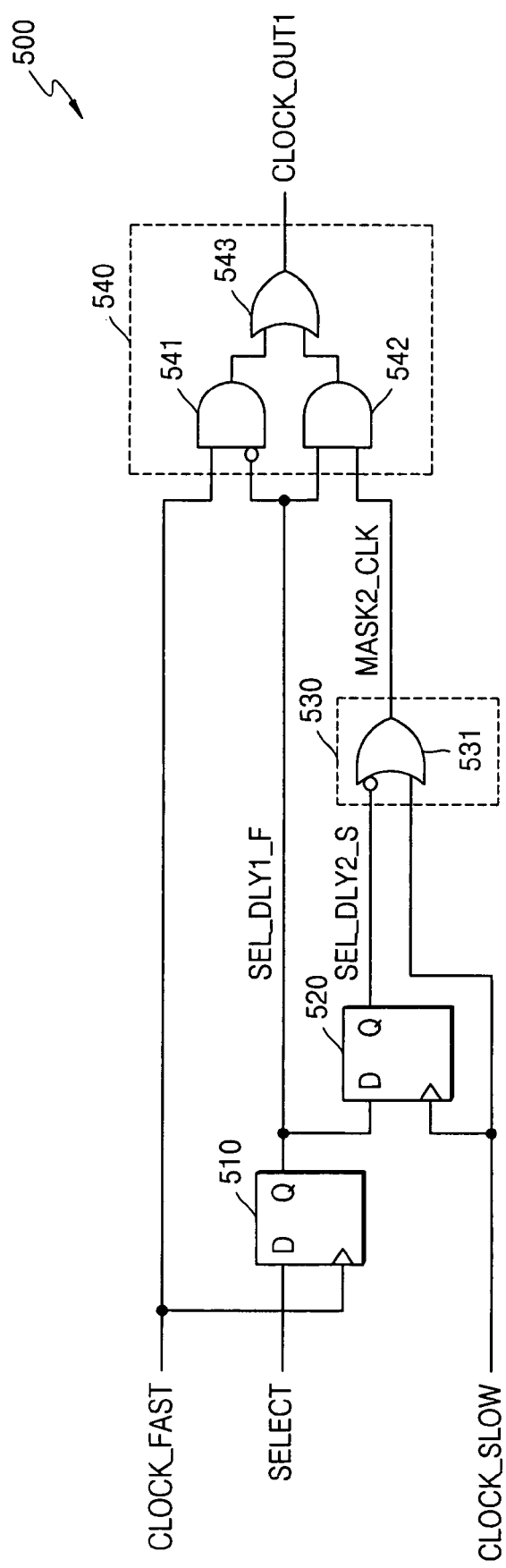
FIG. 5 is a circuit diagram of a clock switching circuit according to a first embodiment of the present invention.
Figure 6:
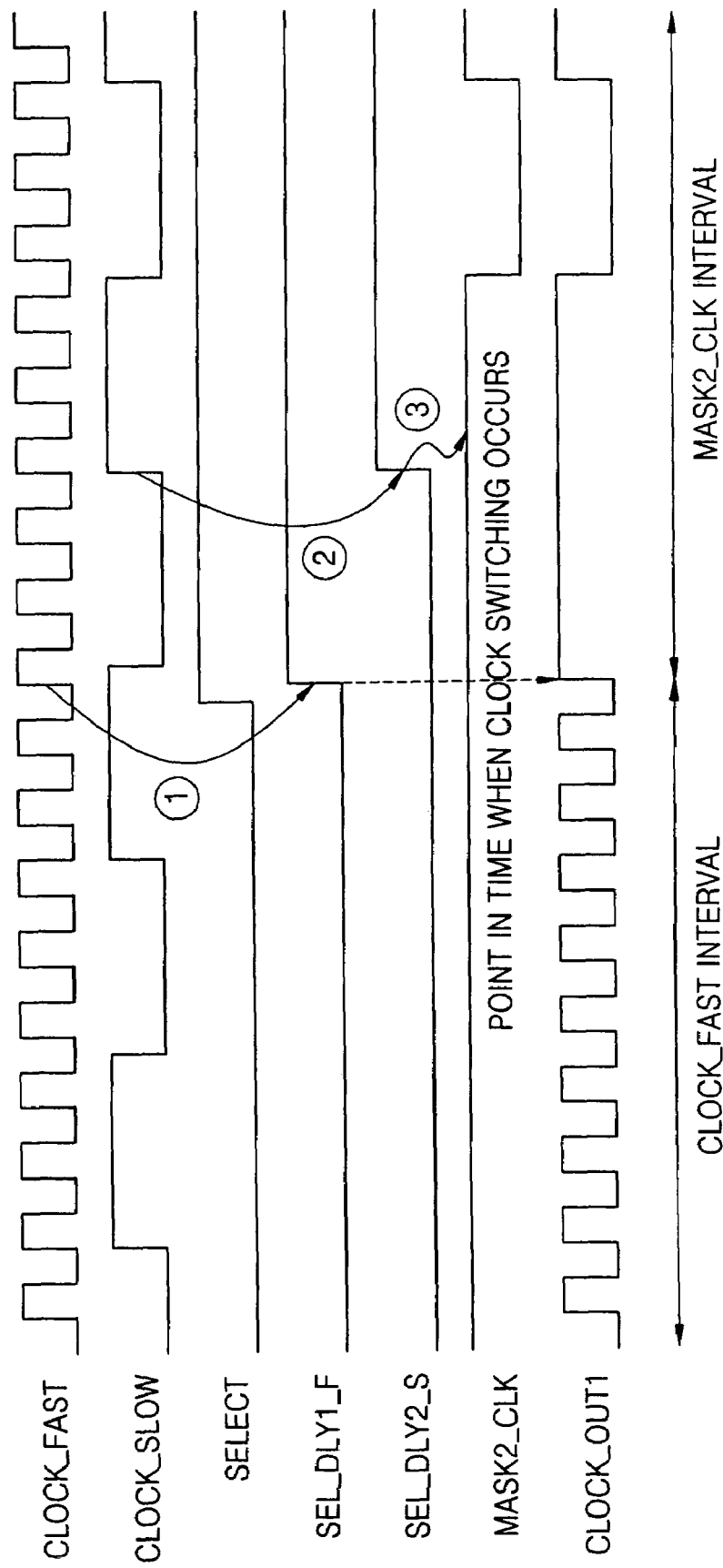
FIG. 6 is a timing diagram of signals during operation of the clock switching circuit of FIG. 5.

FIG. 5 shows a clock switching circuit 500 according to an embodiment of the present invention. FIG. 6 shows a timing diagram of signals during operation of the clock switching circuit 500 of FIG. 5. Referring to FIG. 5, the clock switching circuit 500 includes a synchronizer comprised of a first D flip-flop 510 and a second D flip-flop 520. The clock switching circuit 500 also includes a mask clock generator 530 and an output generator 540.

Referring to FIGS. 5 and 6, the first D flip-flop 510 inputs a selection signal SELECT and generates a first selection delay signal SEL_DLY1_F that is the SELECT signal synchronized to a subsequent rising edge of a fast clock signal CLOCK_FAST. The second D flip-flop 520 inputs the first selection delay signal SEL_DLY1_F and generates a second selection delay signal SEL_DLY2_S that is the first selection delay signal SEL_DLY1_F synchronized to a subsequent rising edge of a slow clock signal CLOCK_SLOW.

The mask clock generator 530 includes an OR gate 531, which outputs a mask clock signal MASK2_CLK from inputs of the slow clock signal CLOCK_SLOW and the second selection delay signal SEL_DLY2_S that is inverted.

The output generator 540 generates an output clock signal CLOCK_OUT1 in response to the fast clock signal CLOCK_FAST, the first selection delay signal SEL_DLY1_F, and the mask clock signal MASK2_CLK. The output generators 540 includes first and second AND gates 541 and 542 and an OR gate 543. The first AND gate 541 inputs the fast clock signal CLOCK_FAST and the first selection delay signal SEL_DLY1_F that is inverted. The second AND gate 542 inputs the first selection delay signal SEL_DLY1_F and the mask clock signal MASK2_CLK. The OR gate 543 is coupled to the outputs of the first and second AND gates 541 and 542 to generate the output clock signal CLOCK_OUT1.

Referring to FIGS. 5 and 6, the first selection delay signal SEL_DLY1_F is the selection signal SELECT that is synchronized to a subsequent rising edge of the fast clock signal CLOCK_FAST (refer to label ① in FIG. 6). The second selection delay signal SEL_DLY2_S is the first selection delay signal SEL_DLY1_F that is synchronized to a subsequent rising edge of the slow clock signal CLOCK_SLOW (refer to label ② in FIG. 6).

The mask clock signal MASK2_CLK is same as the slow clock signal CLOCK_SLOW while the second selection delay signal SEL_DLY2_S is logic high (refer to label ③ in FIG. 6). When the first selection delay signal SEL_DLY1_F is logic low, the output clock signal CLOCK_OUT1 is the fast clock signal CLOCK_FAST. When the first selection delay signal SEL_DLY1_F is logic high, the output clock signal CLOCK_OUT1 is the mask clock signal MASK2_CLK.

Further referring to FIGS. 5 and 6, the output clock signal CLOCK_OUT1 is switched from the fast clock signal CLOCK_FAST to the slow clock signal CLOCK_SLOW when a logic level of the first selection delay signal SEL_DLY1_F makes a transition. When the first selection delay signal SEL_DLY1_F transits from logic low to logic high, the fast clock signal CLOCK_FAST and the mask clock signal MASK2_CLK are both at an identical logic level (i.e., logic high). In addition, note that the mask clock signal MASK2_CLK is at a predetermined logic level (i.e., logic high) between the first selection delay signal SEL_DLY1_F making a transition and the mask clock signal MASK2_CLK becoming the slow clock signal CLOCK_SLOW. Thus, the output clock signal CLOCK_OUT1 has no glitches.

Figure 7:
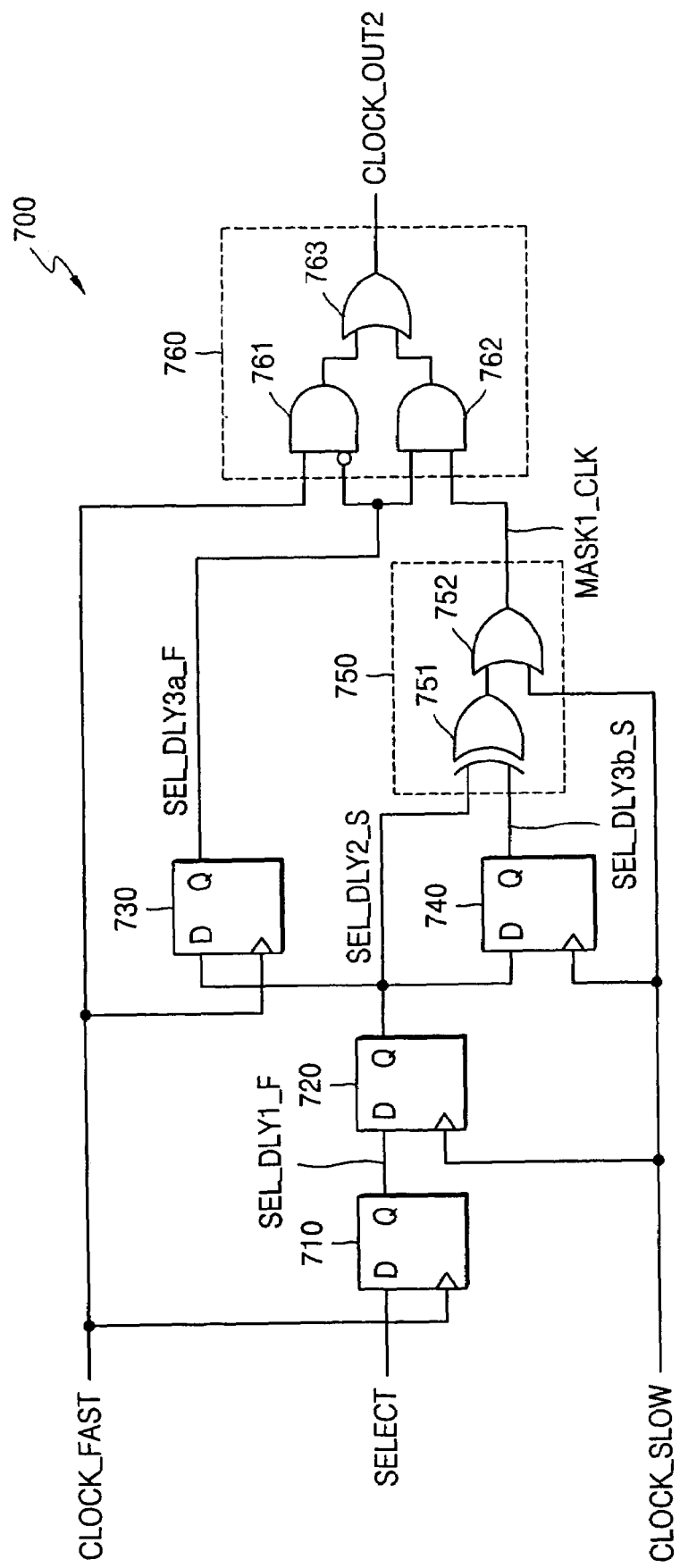
FIG. 7 is a circuit diagram of a clock switching circuit according to another embodiment of the present invention.
Figure 8:
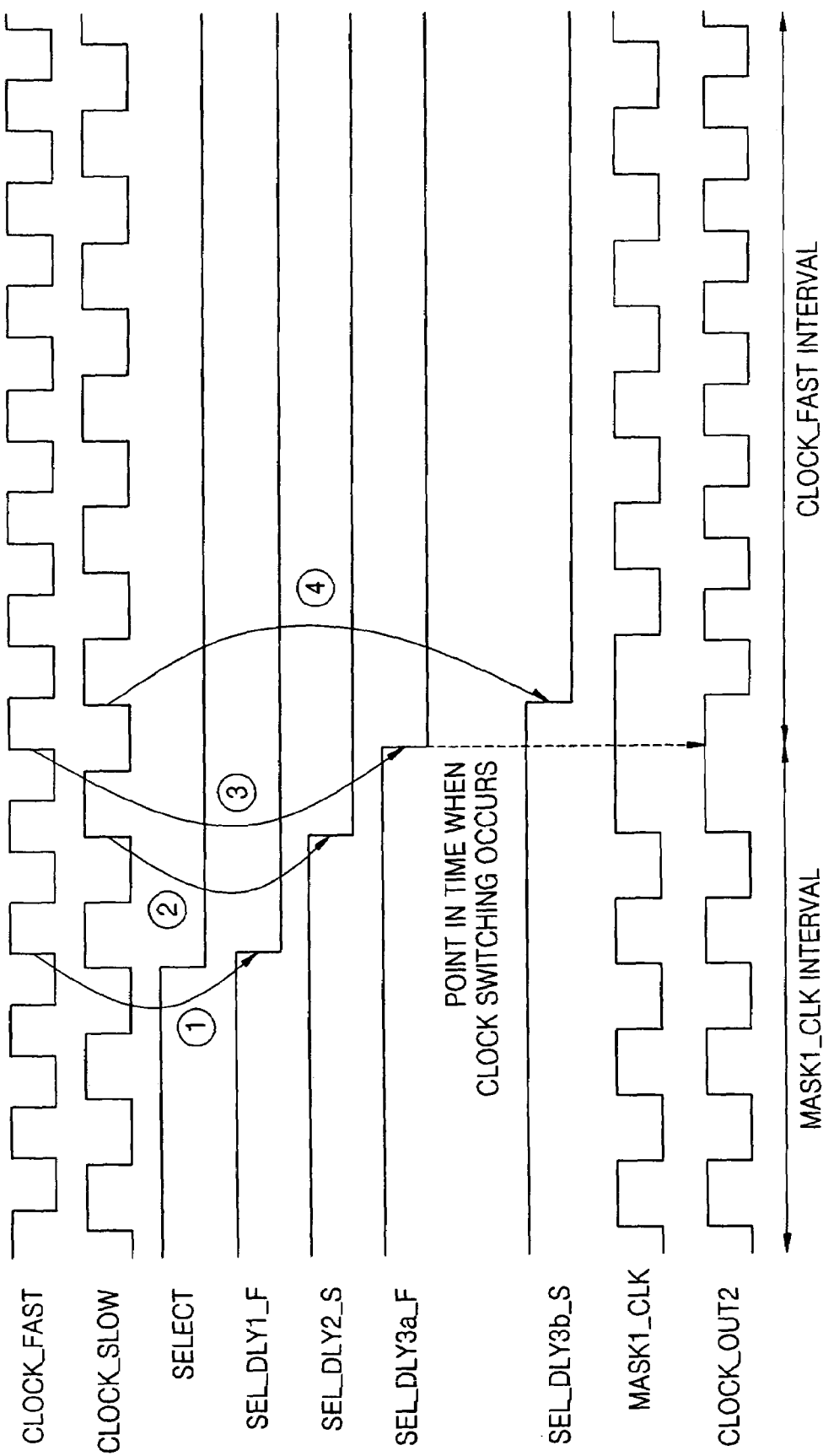
FIG. 8 is a timing diagram of signals during operation of the clock switching circuit of FIG. 7.

FIG. 7 shows a clock switching circuit 700 according to another embodiment of the present invention. FIG. 8 shows a timing diagram of signals during operation of the clock switching circuit 700 of FIG. 7. Referring to FIG. 7, the clock switching circuit 700 includes a synchronizer comprised of a first D flip-flop 710, a second D flip-flop 720, a third D flip-flop 730, and a fourth D flip-flop 740. The clock switching circuit 700 also includes a mask clock generator 750 and an output generator 760.

Referring to FIGS. 7 and 8, the first D flip-flop 510 inputs a selection signal SELECT and generates a first selection delay signal SEL_DLY1_F that is the SELECT signal synchronized to a subsequent rising edge of a fast clock signal CLOCK_FAST. The second D flip-flop 520 inputs the first selection delay signal SEL_DLY1_F and generates a second selection delay signal SEL_DLY2_S that is the first selection delay signal SEL_DLY1_F synchronized to a subsequent rising edge of a slow clock signal CLOCK_SLOW.

The third D flip-flop 730 inputs the second selection delay signal SEL_DLY2_S and generates a third selection delay signal SEL_DLY3a_F that is the second selection delay signal SEL_DLY2_S synchronized to a subsequent rising edge of the fast clock signal CLOCK_FAST. The fourth D flip-flop 740 inputs the second selection delay signal SEL_DLY2_S and generates a fourth selection delay signal SEL_DLY3b_S that is the second selection delay signal SEL_DLY2_S synchronized to a subsequent rising edge of the slow clock signal CLOCK_SLOW.

The mask clock generator 750 is comprised of an XOR (exclusive OR) gate 751 and an OR gate 752. The XOR gate 751 inputs the second selection delay signal SEL_DLY2_S and the fourth selection delay signal SEL_DLY3b_S. The OR gate 752 is coupled to an output of the XOR gate 751 and inputs the slow clock signal CLOCK_SLOW. The OR gate 752 outputs a mask clock signal MASK1_CLK.

The output generator 760 generates an output clock signal CLOCK_OUT2 in response to the fast clock signal CLOCK_FAST, the third selection delay signal SEL_DLY3a_F, and the mask clock signal MASK1_CLK. The output generator 760 comprises first and second AND gates 761 and 762 and an OR gate 763. The first AND gate 761 inputs the fast clock signal CLOCK_FAST and the third selection delay signal SEL_DLY3a_F that is inverted. The second AND gate 762 inputs the third selection delay signal SEL_DLY3a_F and the mask clock signal MASK1_CLK. The OR gate 763 is coupled to the outputs of the first and second AND gates 761 and 762 and generates the output clock signal CLOCK_OUT2.

Referring to FIGS. 7 and 8, the first selection delay signal SEL_DLY1_F is the selection signal SELECT that is synchronized to a subsequent rising edge of the fast clock signal CLOCK_FAST (refer to label ① in FIG. 8). The second selection delay signal SEL_DLY2_S is the first selection delay signal SEL_DLY1_F that is synchronized to a subsequent rising edge of the slow clock signal CLOCK_SLOW (refer to label ② in FIG. 8).

The third selection delay signal SEL_DLY3a_F is the second selection delay signal SEL_DLY2_S that is synchronized to another subsequent rising edge of the fast clock signal CLOCK_FAST (refer to label ③ in FIG. 8). The fourth selection delay signal SEL_DLY3b_S is the second selection delay signal SEL_DLY2_S that is synchronized to another rising edge of the slow clock signal CLOCK_SLOW (refer to label ④ in FIG. 8).

Further referring to FIGS. 7 and 8, the mask clock signal MASK1_CLK is the slow clock signal CLOCK_SLOW when the second and fourth selection delay signals SEL_DLY2_S and SEL_DLY3b_S have same logic levels. Alternatively, the mask clock signal MASK1_CLK is logic high when the second selection delay signal SEL_DLY2_S and the fourth selection delay signal SEL_DLY3b_S have different logic levels.

The output clock signal CLOCK_OUT2 is the mask clock signal MASK1_CLK when the third selection delay signal SEL_DLY3a_F is logic high. The output clock signal CLOCK_OUT1 is the fast clock signal CLOCK_FAST when the third selection delay signal SEL_DLY3a_F is logic low.

At a logic level transition of the third selection delay signal SEL_DLY3a_F, the output clock signal CLOCK_OUT2 is switched in such a manner. At that time point, the fast clock signal CLOCK_FAST and the mask clock signal MASK1_CLK have a same logic level (i.e., logic high). In addition, note that the mask clock signal MASK1_CLK is at a predetermined logic level (i.e., logic high) between the third selection delay signal SEL_DLY3a_F making a transition, and the mask clock signal MASK1_CLK becoming the slow clock signal CLOCK_SLOW. Thus, the output clock signal CLOCK_OUT2 has no glitches when switching from the mask clock signal MASK1_CLK to the fast clock signal CLOCK_FAST.

Figure 9:
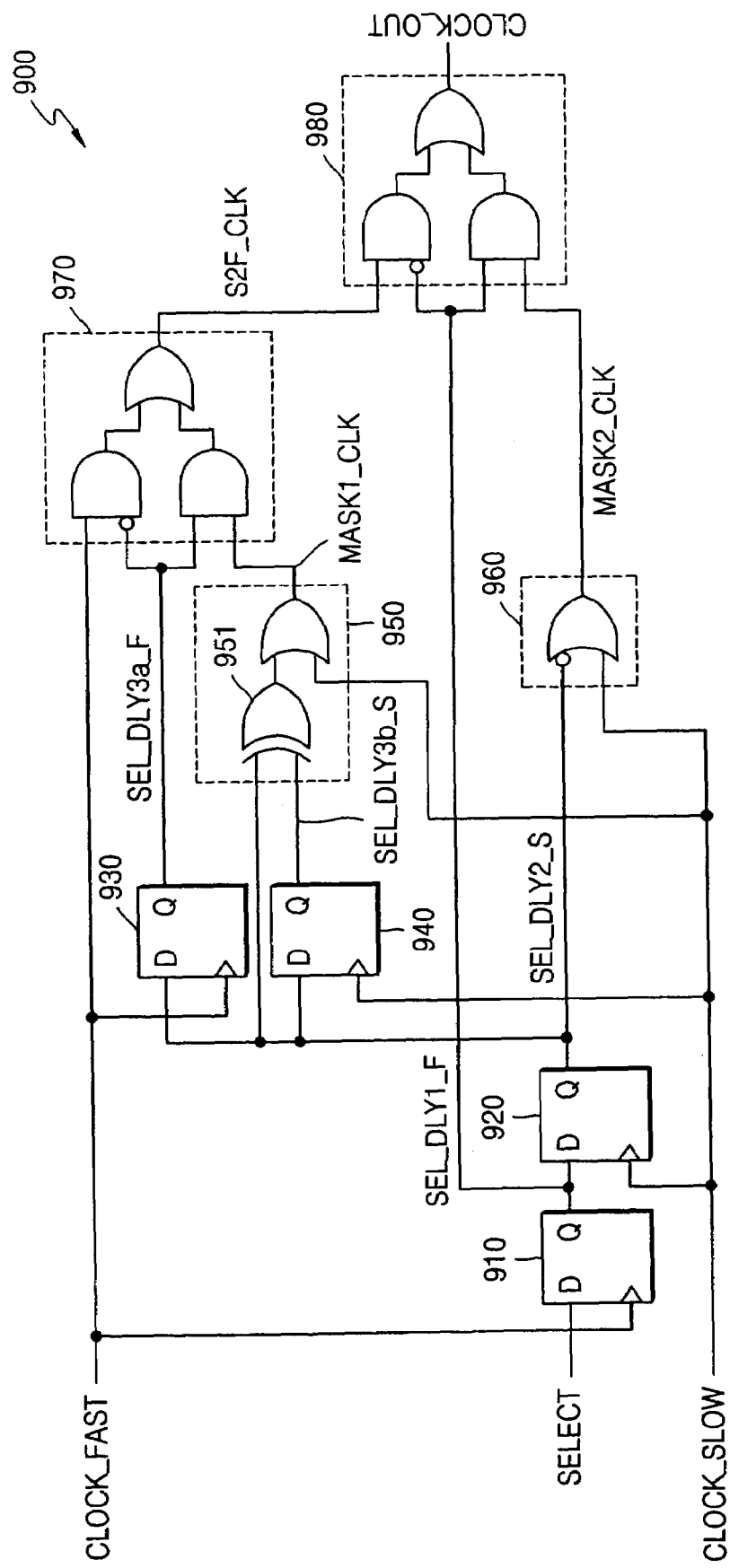
FIG. 9 a circuit diagram of a clock switching circuit according to still another embodiment of the present invention.

FIG. 9 is a circuit diagram of a clock switching circuit 900 according to still another embodiment of the present invention. The clock switching circuit 900 is a combination of the clock switching circuits 500 and 700 of FIGS. 5 and 7. Referring to FIG. 9, the clock switching circuit 900 includes a synchronizer comprised of first, second, third, and fourth D flip-flops 910, 920, 930, and 940. In addition, the clock switching circuit 900 includes first and second mask clock generators 950 and 960, a switching clock generator 970, and an output generator 980.

The first, second, third, and fourth D flip-flops 910, 920, 930, and 940 in FIG. 9 operate similarly to such D flip-flops 710, 720, 730, and 740, respectively, in FIG. 7 to generate a first selection delay signal SEL_DLY1_F, a second selection delay signal SEL_DLY2_S, a third selection delay signal SEL_DLY3a_F, and a fourth selection delay signal SEL_DLY3b_S, respectively.

The first mask clock generator 950 inputs the second and fourth selection delay signals SEL_DLY2_S and SEL_DLY3b_S and the slow clock signal CLOCK_SLOW to generate a first mask clock signal MASK1_CLK. The second mask clock generator 960 inputs the slow clock signal CLOCK_SLOW and the second selection delay signal SEL_DLY2_S that is inverted to generate a second mask clock signal MASK2_CLK.

The switching clock generator 970 generates a switching clock signal S2F_CLK. When the third selection delay signal SEL_DLY3a_F is logic high, the switching clock signal S2F_CLK is the first mask clock signal MASK1_CLK. When the third selection delay signal SEL_DLY3a_F is logic low, the switching clock signal S2F_CLK is the fast clock signal CLOCK_FAST.

The output generator 980 generates an output clock signal CLOCK_OUT. When the first selection delay signal SEL_DLY1_F is logic high, the output clock signal CLOCK_OUT is the slow clock signal CLOCK_SLOW. When the first selection delay signal SEL_DLY1_F is logic low, the output clock signal CLOCK_OUT is the switching clock signal S2F_CLK.

Figure 10:
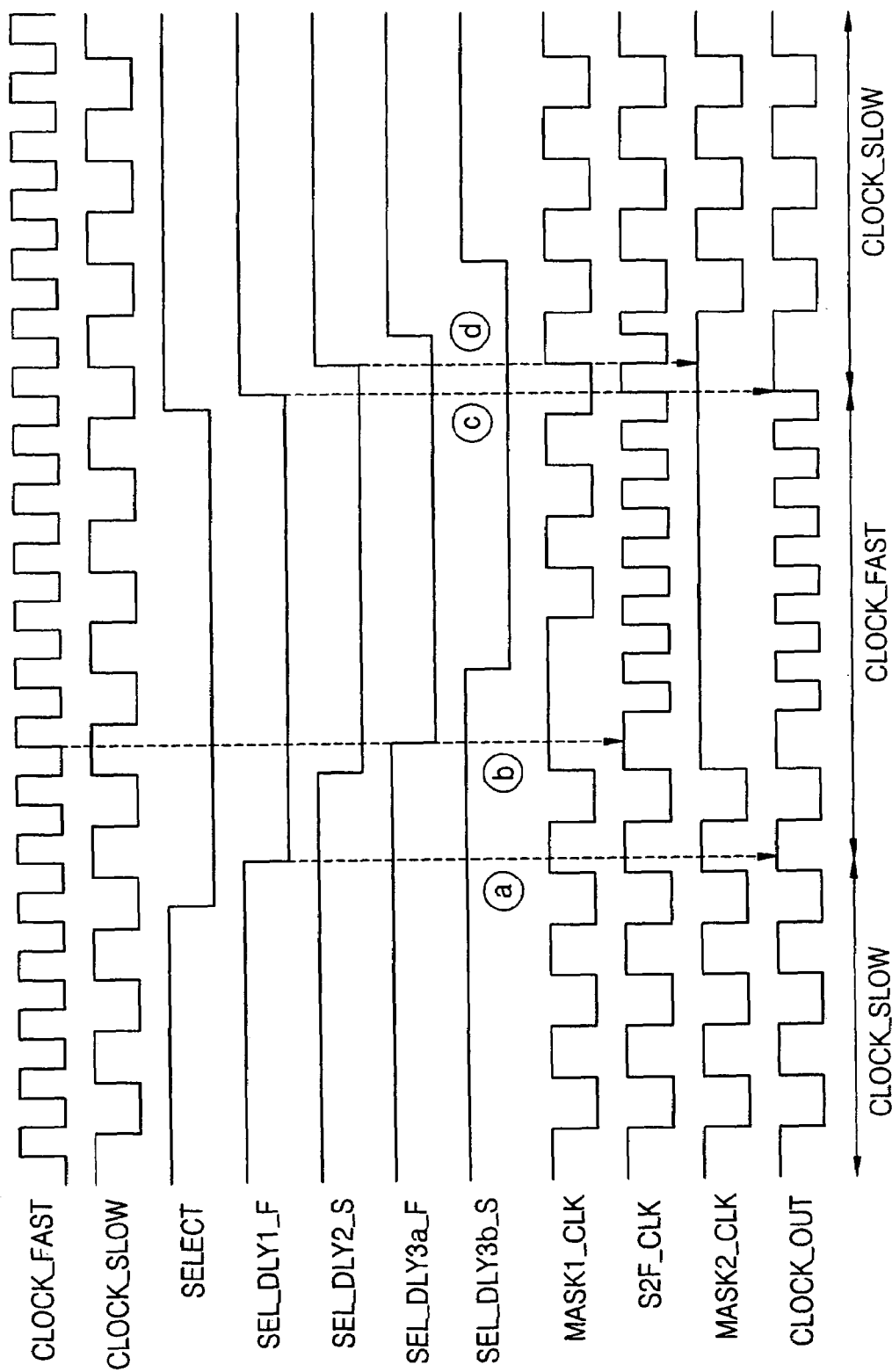
FIG. 10 is a timing diagram of signals during operation of the clock switching circuit of FIG. 9 when a difference between frequencies of clock signals is smaller.
Figure 11:
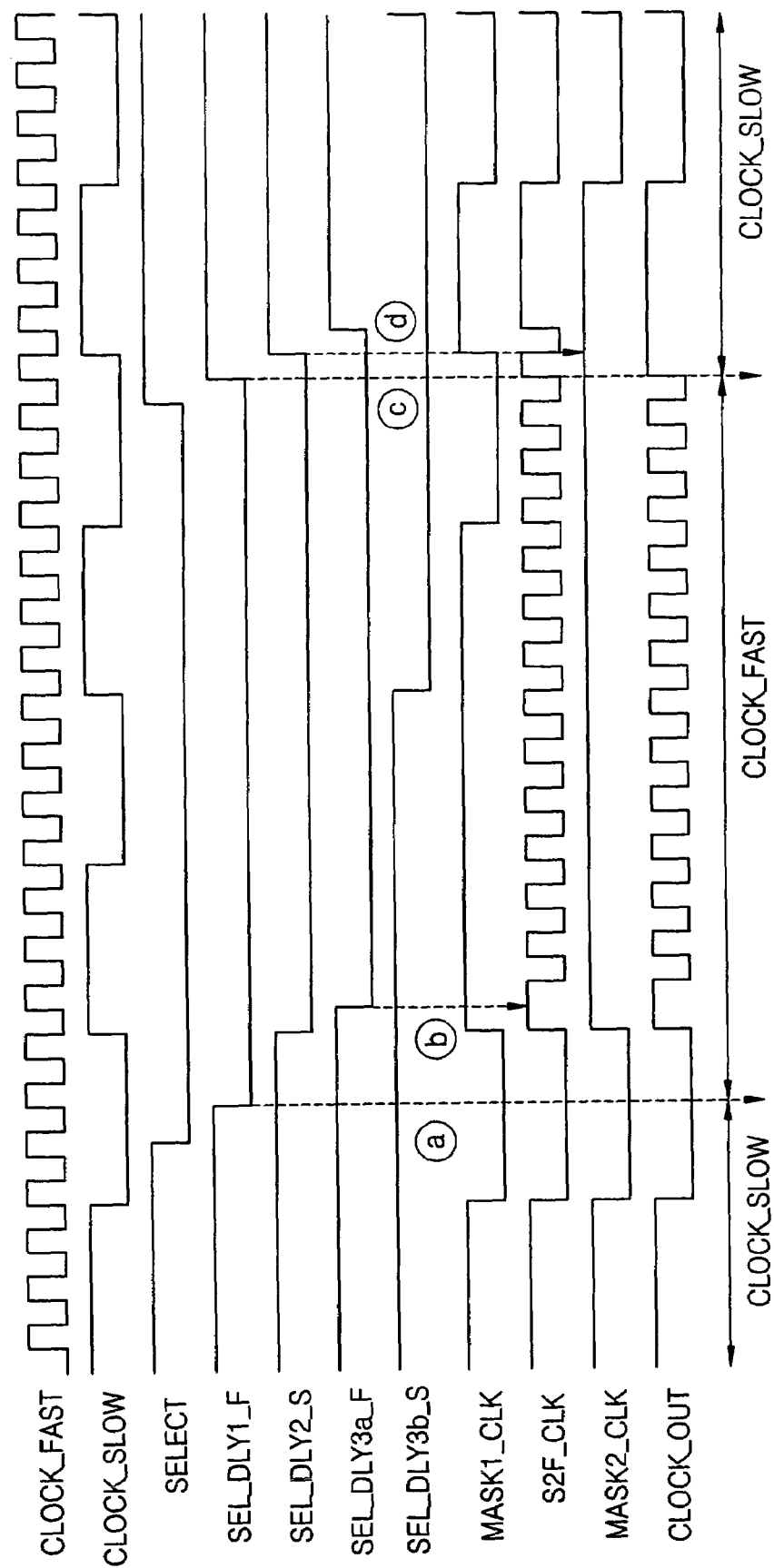
FIG. 11 is a timing diagram of signals during operation of the clock switching circuit of FIG. 9 when the difference between the frequencies of the clock signals is larger.

FIGS. 10 and 11 show timing diagrams during operation of the clock switching circuit 900 of FIG. 9. FIG. 10 is a timing diagram for a smaller difference between frequencies of the fast clock signal CLOCK_FAST and the slow clock signal CLOCK_SLOW. FIG. 11 is a timing diagram for a larger difference between the frequencies of the fast clock signal CLOCK_FAST and the slow clock signal CLOCK_SLOW.

Referring to FIG. 10, the output clock signal CLOCK_OUT is the second mask clock signal MASK2_CLK when the first selection delay signal SEL_DLY1_F is logic high. The second mask clock signal MASK2_CLK has the same waveform as the slow clock signal CLOCK_SLOW when the second selection delay signal SEL_DLY2_S is logic high. Otherwise, the second mask clock signal MASK2_CLK is a predetermined logic level (i.e., logic high) when the second selection delay signal SEL_DLY2_S is logic low.

Upon a transition of the first selection delay signal SEL_DLY1_F from logic high to logic low, the switching clock signal S2F_CLK and the second mask clock signal MASK2_CLK have a same logic level (i.e., logic high). In this manner, the output clock signal CLOCK_OUT is switched from the slow clock signal CLOCK_SLOW to the switching clock signal S2F_CLK without glitches (refer to label ⓐ in FIG. 10).

The switching clock signal S2F_CLK is either the fast clock signal CLOCK_FAST or the first mask clock signal MASK1_CLK depending on a logic level of the third selection delay signal SEL_DLY3a_F. When the third selection delay signal SEL_DLY3a_F is logic high, the switching clock signal S2F_CLK is the first mask clock signal MASK1_CLK. Upon a transition of the third selection delay signal SEL_DLY3a_F from logic high to logic low, the first mask clock signal MASK1_CLK and the fast clock signal CLOCK_FAST are simultaneously logic high. Hence, the output clock signal CLOCK_OUT is switched from the first mask clock signal MASK1_CLK to the fast clock signal CLOCK_FAST without glitches (refer to label ⓑ in FIG. 10).

Thereafter, when the first selection delay signal SEL_DLY1_F transits from a logic low to a logic high, the switching clock signal S2F_CLK and the second mask clock signal MASK2_CLK are simultaneously logic high. Hence, the output clock signal CLOCK_OUT is switched from the switching clock signal S2F_CLK to the second mask clock signal MASK2_CLK without glitches (refer to label ⓒ in FIG. 10). The second mask clock signal MASK2_CLK is the slow clock signal CLOCK_SLOW when the second selection delay signal SEL_DLY2_S transits from a logic low to a logic high (refer to label ⓓ in FIG. 10).

Consequently, for a smaller difference between the frequencies of the fast clock signal CLOCK_FAST and the slow clock signal CLOCK_SLOW, the output clock signal CLOCK_OUT is switched from the slow clock signal CLOCK_SLOW to the fast clock signal CLOCK_FAST without glitches and then from the fast clock signal CLOCK_FAST to the slow clock signal CLOCK_SLOW without glitches.

In the worst case upon switching from the slow clock signal CLOCK_SLOW to the fast clock signal CLOCK_FAST, the clock switching circuit 900 may require one cycle of the fast clock signal CLOCK_FAST to synchronize the output clock signal CLOCK_OUT with the fast clock signal CLOCK_FAST, one cycle of the slow clock signal CLOCK_SLOW to synchronize the output clock signal CLOCK_OUT with the slow clock signal CLOCK_SLOW, and one cycle of the fast clock signal CLOCK_FAST to generate the switching clock signal S2F_CLK. Consequently, a delay corresponding to two cycles of the fast clock signal CLOCK_FAST and one cycle of the slow clock signal CLOCK_SLOW may occur.

In the worst case upon switching from the fast clock signal CLOCK_FAST to the slow clock signal CLOCK_SLOW, the clock switching circuit 900 may require one cycle of the fast clock signal CLOCK_FAST to synchronize the output clock signal CLOCK_OUT with the fast clock signal CLOCK_FAST and one cycle of the slow clock signal CLOCK_SLOW to synchronize the output clock signal CLOCK_OUT with the slow clock signal CLOCK_SLOW. Consequently, a delay corresponding to one cycle of the fast clock signal CLOCK_FAST and one cycle of the slow clock signal CLOCK_SLOW may occur.

The operation of the clock switching circuit 900 with the timing diagram of FIG. 11 is similar to the operation illustrated in the timing diagram of FIG. 10. Thus, a detailed description of FIG. 11 is omitted herein. In this manner, even for a larger difference between the frequencies of the fast clock signal CLOCK_FAST and the slow clock signal CLOCK_SLOW, the output clock signal CLOCK_OUT is switched from the slow clock signal CLOCK_SLOW to the fast clock signal CLOCK_FAST without glitches and then from the fast clock signal CLOCK_FAST to the slow clock signal CLOCK_SLOW without glitches.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A clock switching apparatus comprising:
   a synchronizer for synchronizing a selection signal with a first clock signal to generate a first selection delay signal, and for synchronizing the first selection delay signal with a second clock signal to generate a second selection delay signal;
   a mask clock generator for generating a mask clock signal in response to the second selection delay signal and the second clock signal; and
   an output generator for outputting one of the first clock signal and the mask clock signal as an output clock signal in response to the first selection delay signal.

2. The clock switching apparatus of claim 1, wherein the selection signal has a transition for indicating that the output clock signal is to switch from the first clock signal to the second clock signal.

3. The clock switching apparatus of claim 2, wherein the mask clock signal is a predetermined logic level until the transition occurs in the second selection delay signal, and wherein the mask clock signal is the second clock signal after the transition occurs in the second selection delay signal.

4. The clock switching apparatus of claim 3, wherein the output generator outputs the first clock signal until the transition in the first selection delay signal, and outputs the mask clock signal after the transition in the first selection delay signal.

5. The clock switching apparatus of claim 1, wherein the synchronizer includes:
   a first D flip-flop that outputs the selection signal synchronized to a rising edge of the first clock signal as the first selection delay signal; and
   a second D flip-flop that outputs the first selection delay signal synchronized to a rising edge of the second clock signal as the second selection delay signal.

6. The clock switching apparatus of claim 1, wherein the mask clock generator includes:

an OR gate that inputs the second clock signal and the second selection delay signal that is inverted, and that outputs the mask clock signal.

7. The clock switching apparatus of claim 1, wherein the output generator includes:
  a first AND gate that inputs the first selection delay signal the is inverted and the first clock signal;
  a second AND gate that inputs the first selection delay signal and the mask clock signal; and
  an OR gate that is coupled to outputs of the first and second AND gates and that outputs the output clock signal.

8. A clock switching apparatus comprising:
  a synchronizer for synchronizing a selection signal with a first clock signal to generate a first selection delay signal, and for synchronizing the first selection delay signal with a second clock signal to generate a second selection delay signal, and for synchronizing the second selection delay signal with the first clock signal to generate a third selection delay signal, and for synchronizing the second selection delay signal with the second clock signal to generate a fourth selection delay signal;
  a mask clock generator for generating a mask clock signal in response to the second and fourth selection delay signals and the second clock signal; and
  an output generator for outputting one of the first clock signal and the mask clock signal as an output clock signal in response to the third selection delay signal.

9. The clock switching apparatus of claim 8, wherein the selection signal has a transition for indicating that the output clock signal is to switch from the second clock signal to the first clock signal.

10. The clock switching apparatus of claim 9, wherein the mask clock signal is a predetermined logic level when the second and fourth selection delay signals are a same logic level, and wherein the mask clock signal is the second clock signal when the second and fourth selection delay signals are different logic levels.

11. The clock switching apparatus of claim 10, wherein the output generator outputs the first clock signal until the transition in the third selection delay signal, and outputs the mask clock signal after the transition in the third selection delay signal.

12. The clock switching apparatus of claim 8, wherein the synchronizer includes:
  a first D flip-flop that outputs the selection signal synchronized to a rising edge of the first clock signal as the first selection delay signal;
  a second D flip-flop that outputs the first selection delay signal synchronized to a rising edge of the second clock signal as the second selection delay signal;
  a third D flip-flop that outputs the second selection delay signal synchronized to a rising edge of the first clock signal as the third selection delay signal; and
  a fourth D flip-flop that outputs the second selection delay signal synchronized to a rising edge of the second clock signal as the fourth selection delay signal.

13. The clock switching apparatus of claim 8, wherein the mask clock generator includes:
  an exclusive OR gate that inputs the second and fourth selection delay signals; and
  an OR gate that inputs the second clock signal and an output of the exclusive OR gate and that outputs the mask clock signal.

14. The clock switching apparatus of claim 8, wherein the output logic unit comprises:
  a first AND gate that inputs the first clock signal and the third selection delay signal that is inverted;
  a second AND gate that inputs the third selection delay signal and the mask clock signal; and
  an OR gate coupled to outputs of the first and second AND gates and that outputs the output clock signal.

15. A clock switching apparatus comprising:
  a synchronizer for synchronizing a selection signal with a first clock signal to generate a first selection delay signal, and for synchronizing the first selection delay signal with a second clock signal to generate a second selection delay signal, and for synchronizing the second selection delay signal with the first clock signal to generate a third selection delay signal, and for synchronizing the second selection delay signal with the second clock signal to generate a fourth selection delay signal;
  a first mask clock generator for generating a first mask clock signal in response to the second and fourth selection delay signals and the second clock signal;
  a second mask clock generator for generating a second mask clock signal in response to the second selection delay signal and the second clock signal;
  a switching clock generator for outputting one of the first clock signal and the first mask clock signal as a switching clock signal in response to the third selection delay signal; and
  an output generator for outputting one of the switching clock signal and the second mask clock signal as an output clock signal in response to the first selection delay signal.

16. The clock switching apparatus of claim 15, wherein the synchronizer includes:
  a first D flip-flop that outputs the selection signal synchronized to a rising edge of the first clock signal as the first selection delay signal;
  a second D flip-flop that outputs the first selection delay signal synchronized to a rising edge of the second clock signal as the second selection delay signal;
  a third D flip-flop that outputs the second selection delay signal synchronized to a rising edge of the first clock signal as the third selection delay signal; and
  a fourth D flip-flop that outputs the second selection delay signal synchronized to a rising edge of the second clock signal as the fourth selection delay signal.

17. The clock switching apparatus of claim 15, wherein the first mask clock generator includes:
  an exclusive OR gate that inputs the second and fourth selection delay signals; and
  an OR gate that inputs the second clock signal and an output of the exclusive OR gate and that outputs the first mask clock signal.

18. The clock switching apparatus of claim 15, wherein the second mask clock generator includes:
  an OR gate that inputs the second clock signal and the second selection delay signal that is inverted and that outputs the second mask clock signal.

19. The clock switching apparatus of claim 15, wherein the switching clock generator includes:
  a first AND gate for receiving the first clock signal and the third selection delay signal that is inverted;
  a second AND gate for receiving the third selection delay signal and the first mask clock signal; and
  an OR gate that is coupled to outputs of the first and second AND gates and that outputs the switching clock signal.

20. The clock switching apparatus of claim 15, wherein the output generator comprises:

a first AND gate that inputs the switching clock signal and the first selection delay signal that is inverted;

a second AND gate that inputs the second mask clock signal and the first selection delay signal; and an OR gate that is coupled to outputs of the first and second AND gates and that outputs the output clock signal.

* * * * *